United States Patent [19]

English

[11] 4,162,199
[45] Jul. 24, 1979

[54] REMOVING ORGANIC COMPONENTS FROM AN AQUEOUS CLEANING SOLUTION

[75] Inventor: Joseph J. English, Sycamore, Ill.

[73] Assignee: Earl J. Kuntz, Chicago, Ill. ; a part interest

[21] Appl. No.: 687,520

[22] Filed: May 18, 1976

[51] Int. Cl.$^2$ .................. B01D 11/04; B01D 3/00
[52] U.S. Cl. .................. 203/39; 203/DIG. 16; 134/10; 202/169; 210/21; 422/260; 252/135
[58] Field of Search .................. 202/169, 168, 170; 210/21, 167; 134/12, 10, 11, 40, 309, 310; 23/270.5; 196/14.52; 427/345; 203/39, 43, 10, 11, DIG. 16

[56] References Cited

U.S. PATENT DOCUMENTS

| | | | |
|---|---|---|---|
| 704,011 | 7/1902 | Edson | 202/169 |
| 1,437,743 | 12/1922 | Arii | 202/169 |
| 1,679,728 | 8/1928 | Lynn | 202/169 |
| 1,837,493 | 12/1931 | Seil | 202/169 |
| 2,201,729 | 5/1940 | Hood | 202/169 |
| 2,532,299 | 12/1950 | Greco | 202/169 |
| 2,660,518 | 11/1953 | White | 202/169 |
| 2,673,208 | 3/1954 | Andrews et al. | 202/169 |
| 3,365,395 | 1/1968 | McDonald | 210/21 |
| 3,610,260 | 10/1971 | Kearney | 134/19 |
| 3,764,265 | 10/1973 | Fijalkowski | 134/10 |
| 3,803,005 | 4/1974 | Miserlis et al. | 203/85 |
| 3,899,348 | 8/1975 | Tedden | 134/12 |
| 3,930,879 | 1/1976 | Erickson et al. | 210/104 |

*Primary Examiner*—Wilbur L. Bascomb, Jr.
*Attorney, Agent, or Firm*—Eugene F. Friedman

[57] ABSTRACT

A method and apparatus for removing organic contaminants from an aqueous metal-cleaning solution. The apparatus includes a first conduit, or pipe, for removing portions of the contaminated aqueous solution from its tank. The solution enters an extractor which permits intimate contact between the contaminated solution and an organic solvent. A second tube, or conduit, returns the aqueous solution, purified by this contact, to the original tank. A third conduit removes the organic solvent from the extractor after its contact with the aqueous solution, by which time it will contain organic components from the aqueous solution. This solvent, with the contaminants, enters a separator, such as a still, which removes the contaminants from it. The purified organic solvent then returns to the extractor along a fourth conduit. The cleansing operation proceeds intermittently or, preferably, continuously. Consequently, only a small amount of the aqueous solution need undergo purification at any particular time in order to maintain the organic contaminant level sufficiently low. The remainder of the aqueous solution stays in its original tank where it remains available for use notwithstanding the concurrent operation of the purification process.

8 Claims, 2 Drawing Figures

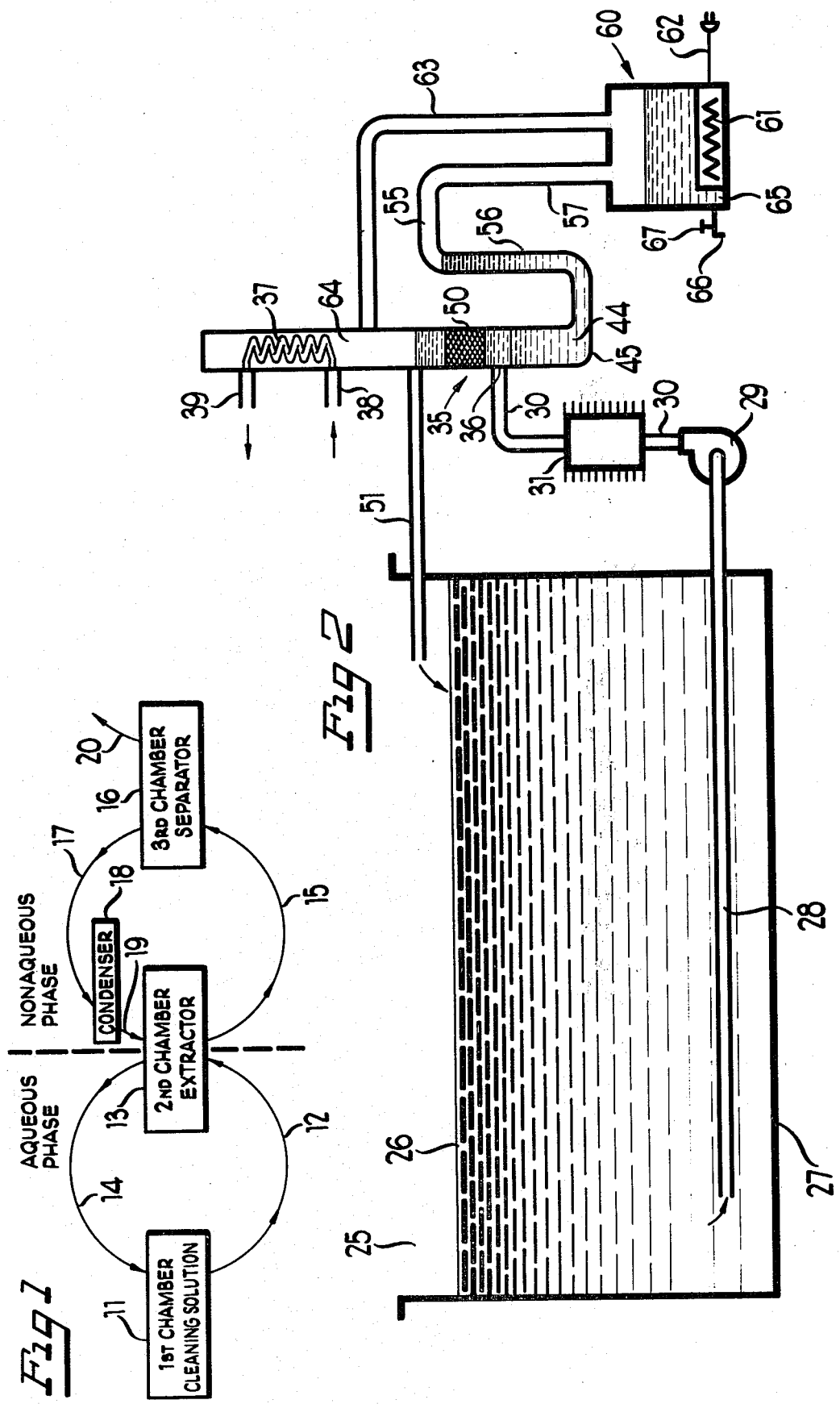

REMOVING ORGANIC COMPONENTS FROM AN AQUEOUS CLEANING SOLUTION

BACKGROUND OF THE INVENTION

The shaping and working of metal frequently leaves a film of oil upon the object produced. This oil on the surface of the metal may deleteriously affect the subsequent use of the item produced. For example, an oily film will likely interfere with and even preclude the adherence of a paint to a metal surface.

As a result, a section of metal, after undergoing various metalworking operations, must have its surface cleaned of organic, oily substances. A process frequently employed to accomplish this object involves simply immersing the metal object into a caustic aqueous solution. Various solutions with different components and additives have performed this function well and effectively removed organic components from metals.

The problem arises, of course, that the organic components removed from the metal remain in the caustic solution as contaminants. After a number of uses, the level of these contaminants will increase to the point where the solution no longer serves its purpose.

Metalworking companies, faced with this problem in the past, have simply disposed of the contaminated caustic solution by dumping it down a drain. This technique of refreshing the cleaning solution faces a number of significant drawbacks. First, of course, the cleaning solution has an inherent value which accompanies the solution down the drain. Furthermore, various governmental authorities no longer tolerate such dumping of potent chemicals into the sewer system. If the sewage enters a body of water without treatment, the chemicals in the cleaning solution will, of course, adversely affect the quality of that water.

More frequently, though, the sewage undergoes treatment before finding its way into a water system. The chemicals in the sewage from the cleaning solution immensely add to the burden of treating that sewage to the desired degree of water purity. Consequently, the unit of government responsible for the particular sewer system involved may totally prohibit the introduction of such potent chemicals into the system. Alternatively, it may impose a severe charge on the dumper in order to compensate for the burden thus imposed. In any event, a company with a contaminated cleaning solution may now find it impropitious or impossible to dump it into the sewer.

Many metal workers, faced with this problem of contaminated and undisposable cleaning solution, have it hauled away by tank truck. This procedure, of course, incurs the economic burden of paying for the removal service, in addition to the necessity of purchasing the components for further cleaning solution. Moreover, once a solution becomes spent, the metal-working company may have to cease this phase of its operation until its truck arrives and removes the useless liquid. Alternatively, the metal company could make the financial investment of developing sufficient suitable storage capacity for the spent solution until the trucker arrives. Either course, though, represents an appreciable expense to the company.

Various techniques exist for removing comparatively nonpolar components from a polar aqueous solution. The simplest of these involves the use of a separatory funnel in conjunction with an organic solvent. Shaking the aqueous solution together with the organic solvent typically results in the organic components moving from the aqueous phase to the organic phase. This method, of course, presumes the use of an organic solvent that forms a separate phase from the aqueous solution.

Clearly, however, this method of removing the organic components has no practical utility for a metalworking shop. To mix the aqueous solution with an organic solvent represents a time-consuming, arduous, and wasteful proposition. This task may also remove the cleaning solution from active use for an unacceptably long period of time. Moreover, even were this technique to find use in this situation, it would simply substitute, for the contaminated cleaning solution, a contaminated organic solvent; the latter would also pose a disposal problem.

A somewhat more sophisticated approach appears in D. McDonald's U.S. Pat. No. 3,365,395. In it, he treates raw sewage in order to produce clean water for release into the receiving lake or river. One apsect of the extensive treatment involves mixing a halogenated hydrocarbon solvent with the body of sewage at several points in order to remove greases, fats, and oils entrained within it. He then distills his solvent to allow its reuse.

The apparatus shown by McDonald apparently works well for sewage. However, it would still suffer the drawbacks discussed above for the simple separatory-funnel procedure if used for metal-cleaning solutions. Again, it would remove the aqueous solution from actual use in cleaning metals in order to purify it of the contaminants. Moreover, the extensive and expensive apparatus shown represents an investment totally out of proportion with the magnitude of the problem posed.

J. G. Miserlis et al., in their U.S. Pat. No. 3,803,005, attempt to avoid the problem of the contaminated aqueous solution by dispensing with it entirely. Instead, they use the hydrocarbon solvent trichloroethylene directly to degrease metals. However, having open vats for dipping metals into trichloroethylene allows uncontrollable amounts of the solvent to escape into the atmosphere. There, it would pose a health hazard to the employees, and, consequently, require extensive ventilating apparatus to remove it from the working atmosphere. Moreover, trichloroethylene will not remove stains.

SUMMARY

Unlike the systems described above, a caustic cleaning for metals need never become absolutely free of greases and oils. The amount of contaminants within the aqueous solution need only remain below that level at which the solution loses its effectiveness in cleaning metal. Maintaining an acceptably low level of contaminants does not require cleaning the entire tank of caustic solution. On the contrary, removing relatively small portions of the solution and cleaning and returning them to the tank can suffice to keep the overall level of greases and oils low. The bulk of the caustic solution stays in the tank where it remains continuously available for use in cleaning metals. The apparatus need never shut down to refresh or replenish the cleaning solution.

To maintain the level of contaminants in the cleaning solution at an acceptably low level, portions of it should undergo at least intermittent removal for cleaning. Most conveniently, the removal process with the subsequent cleaning should proceed continuously.

Extracting the organic contaminants from the cleaning solution results from their preferential solubility in a separate solvent as compared to the cleaning solution. The solvent should display substantial immiscibility with the aqueous solution. Generally, it will represent an organic compound, with the halogenated hydrocarbons representing a good choice.

The actual extraction of the contaminants involves bringing this organic solvent into intimate contact with the removed portions of cleaning solution. To perform properly, the solvent employed has a greater solubility for these undesired ingredients than the solution itself. Also, the solvent must have a different specific gravity than the solution in order that the two may separate from each other with the usual phase barrier between them. Otherwise the two liquids would tend to remain suspended in each other, without producing the desired phase separation.

The intimate contact between the cleaning solution and the solvent will reduce or eliminate the concentration of organic contaminants in the former. After the contact, the cleaning solution may then return to the original container where it reduces the overall level of contaminants in the solution.

On the other hand, the contact between the solution and the solvent increases the level of organic contaminants in the latter. Consequently, to allow the reuse of the solvent, it too should lose its concentration of contaminants. Thus refurbished and refreshed, the solvent may contact further portions of cleaning solution to decontaminate them.

The apparatus for removing the organic components from a solution in a container includes, first, an extractor which posseses a double purpose. Primarily, it serves to establish the required intimate contact between the cleaning solution and the solvent. After this contact, the extractor will then temporarily hold both of these liquids.

The apparatus next includes a first carrying means, commonly a conduit, in fluid communication with both the container and extractor. It serves to transport portions of the cleaning solution from the container to the extractor for purification. A second conduit will return the cleaning solution, which has undergone degreasing, back to the container from the extractor.

To allow the reuse of the solvent, the apparatus also has a separator. This removes from the solvent the organic components which the solvent picked up from the cleaning solution. Conveniently, this may take the form of a still.

Lastly, the apparatus includes a third and fourth carrying means, with both in fluid communication with the separator and the extractor. The former carries the solvent with the organic contaminants from the extractor, where it has acquired them to the separator, where it will lose them. The latter takes the refurbished solvent from the separator back to the extractor where it may contact further aqueous cleaning solution.

BRIEF DESCRIPTION OF THE FIGURES

FIG. 1 shows schematically the overall layout of an apparatus for removing the organic components entrained in a cleaning solution.

FIG. 2 shows an actual apparatus that will effectuate such removal.

DETAILED DESCRIPTION

In FIG. 1, most of the aqueous cleaning solution sits in the first chamber where it remains available for use in cleaning metal parts. Portions of this cleaning solution, however, move along the path 12 to the second chamber 13, which functions as an extractor. This extractor allows a solvent to contact the cleaning solution and remove organic contaminants from it. The cleaning solution, with the organic components removed, then traverses the path 14 back to the original first chamber 11 where it joins the bulk of the solution. With a negligible content of contaminants, this solution mixes with the remaining solution to effect a lowering of the overall level of such contaminants.

The solvent which has intimately contacted the cleaning solution in the extractor 13 follows the path 15 to the third chamber, or separator, 16. The separator 16 refurbishes the solvent by removing from it the organic contaminants it has acquired from the aqueous cleaning solution. Frequently, it will do so by distilling off the solvent which generally has a lower boiling point than the oils and greases entrained in it. After this occurs, the solvent vapor then follows the path 17 to the condenser 18 which restores it to the liquid state. From there, it proceeds along the path 19 back to the extractor 13 where it will contact and cleanse further cleaning solution. The oils and greases removed from the solvent may undergo removal from the separator 16 along the path 20.

FIG. 2 gives specific examples of components of apparatus that will remove organic contaminants from an aqueous metal-cleaning solution without withdrawing the bulk of the solution from active use. As shown in that figure, the large portion of the aqueous cleaning solution 26 sits in the container 27. The large opening 25 at the top of the container 27 allows for the immersing of various metal pieces which need to be cleaned. When placed in the tank 27, oils and greases on the metal part dissolve into the solution.

The cleaning solution 26 generally contains components which will help dissolve the oils and greases on the metal into the body of the liquid. These typically include 0.8 to 32 ounces per gallon of sodium or potassium hydroxide and a similar amount of sodium carbonate.

As a further ingredient, the solution typically has 0.8 to 32 ounces per gallon of a sodium phosphate or silicate. The latter has found greater acceptance for this use and includes in addition to the usual silicates with the formula $Na_2O.xSiO_2$ ($x=3-5$), the disilicate ($Na_2Si_2O_5$), the metasilicate ($NaSiO_3$ and $NaSiO_3.9H_2O$), and the orthosilicate ($Na_4SiO_4$). Amongst these, the metasilicate represents the preferred choice.

A surfactant, emulsifier, syndet, or the like may also find use in the solution. If employed, it will promote the solubilization of the oil into the caustic cleaning solution. However, the quantity used should remain below that which will result in the emulsification of the organic solvent used to clean the solution with the aqueous solution itself. Generally, the appropriate quantity will fall in the range of 0 to 32 ounces per gallon.

The solution 26, to undergo purification, enters the conduit 28. The pump 29 then passes it into the conduit 30, through the cooler 31, and into the extractor 35.

The cooler 31 reduces the temperature of the solution 26 before it makes contact with the purifying solvent. The solution 26 while in the tank 27, frequently has an elevated temperature, often in the range of 170° to 180° F. The increased temperature aids in the cleaning of the metal. On the other hand, 1,1,1-trichloroethane boils at 166° F. Contacting the two with the cleaning solution at 180° F. may well result in the evaporation of the solvent. As a vapor, it cannot perform its cleansing function on the solution. Cooling the solution precludes this deleterious change of state of the solvent.

An air cooler, with fins, such as that shown in FIG. 2 will suffice for this purpose. If the need exists, a suitable heat exchanger could take its place.

A higher boiling point of the solvent than that of the solution obviates any cooling of the latter prior to contact between the two. As an example, perchloroethylene, also known as tetrachloroethene, boils at 240° F., or well above the usual operating temperature of the solution. However, the higher boiling point of the solvent makes its separation from the organic contaminants by a subsequent distillation more difficult, requiring greater heat to accomplish the task.

The solution 26 enters the extractor 35 at the point 36 where the conduit 30 connects to the extractor 35. Once inside the extractor 35, the solution receives falling drops of solvent from the condenser coils 37. These coils 37 have an inlet and outlet 38 and 39, respectively, to receive a coolant from an external source.

The solvent displays a preferential solubility for the organic contaminants entrained in the cleaning solution as compared to the solution itself. Consequently, the drops of solvent, as they pass through the cleaning solution, will capture these organic components from the aqueous solution. The solvent then collects as the pool 44 at the bottom 45 of the extractor 35.

The extractor 35 also includes the mixer 50 to help increase the degree of contact between the cleaning solution and the solvent. While most any form of mixer will suffice, desirably it should not create such turbulence as to interfere with the effective separation between the organic and aqueous phases. A motionlesss mixer, such as suspended glass particles or fins on the side of the extractor 35, represents a suitable choice.

After its intimate contact with the organic solvent, the purified cleaning solution then returns along the conduit 51 to the tank 27. Moreover, the amount of liquid in the extractor 35 increases under the action of both the pump 29 and the condenser 37. The weight of this liquid forces the solvent 44 over the top 55 of the inverted "U" in the conduit 56 from the extractor 35 to the separator 60. The solvent which flows over the top 55 then descends along the straight portion 57 in the conduit 56 until it enters the separator 60.

The separator 60 extracts from the solvent the organic oils and greases which the solvent picked up through its contact witht the cleaning solution 26. The simplest way to effectuate this separation involves the use of a distilling apparatus. Accordingly, FIG. 2 shows a source of heat 61 connected to a power source 62. This heat will differentially distill off the solvent which then traverses the conduit 63 as a vapor until it reaches tube 64 at the top of the extractor 35. There it will approach the coil 37, condense and, under the influence of gravity, fall and make contact with further cleaning solution.

The oils and greases which have a higher boiling point than the solvent will collect in the bottom of the separator 60 in a pool 65. From there, when convenient, they may pass out through the spigot 66 under the control of the valve 67.

In particular, FIG. 2 suggests using a solvent heavier than the aqueous cleaning solution. This represents the case, for example, with trichloroethylene. Such a relationship produces various benefits. First, after the solvent falls from the coil 37, it passes through the cleaning solution and makes the intimate contact required to effect its purification.

Furthermore, the particular orientation of conduits shown at the extractor 35 in FIG. 2 achieves countercurrent flow between the aqueous cleaning solution and the organic solvent. Thus, the aqueous solution from the conduit 30 enters the extractor 35 and, under the force of the pump 31, moves upwards until it meets with the conduit 51 which passes it back to the tank 27. On the other hand, the solvent from the coils 37 flows downward through the upward flowing aqueous solution until it joins the pool 44 of solvent, after which it may pass over the inverted "U" 55 to reach the separator 60. Thus, the aqueous solution flows upward and the solvent flows downward while contacting each other. This increases the amount and efficacy of the intimate contact and, thus, helps transfer the organic components from the aqueous solution to the solvent.

As also implied in FIG. 2, the organic solvent and the aqueous cleaning solution should display substantial immiscibility toward each other. Otherwise, the solvent could possess less effectiveness in removing the organic contaminants from the tank 27.

Moreover, placing a substantial amount of solvent into the tank 27 could create an unhealthy amount of solvent above the container 27. Immiscibility between the solvent and the solution should minimize this problem. However, if needed, the apparatus could include, as part of the conduit 51, a device for removing even traces of the organic solvent from the aqueous cleaning solution prior to its return to the container 27.

An actual aqueous cleaning solution that has seen use with the above apparatus included, per gallon of solution:

2⅜ oz. of NaOH
2⅜ oz. of $Na_2CO_3$, and
2⅜ oz. of $NaSiO_3$.

Other ratios and strengths could also suffice. In particular, increasing the overall strength would probably result in a solution with greater cleaning ability.

Accordingly, what is claimed is:

1. A method for removing organic components from a cleaning solution in a container comprising:
   (A) at least intermittenly removing portions of said solution from said container;
   (B) establishing intimate contact between said portions and an amount of solvent substantially immiscible with and of a different specific gravity than said solution, said solvent having a greater solubility for said organic components than the solubility said cleaning solution has for said organic components;
   (C) returning, after said intimate contact, said portions to said container;
   (D) separating, after said intimate contact, organic components from said amount of solvent; and
   (E) after said separating of organic components from said amount of solvent, establishing contact between said amount of solvent and a portion of said cleaning solution.

2. The method of claim 1 wherein the step of removing portions of said solution is performed continuously.

3. The method of claim 1 wherein said solvent has a greater specific gravity than said cleaning solution and the step of establishing intimate contact between said solvent and said portions of solution is accomplished by dropping said solvent onto said portions of solution.

4. The method of claim 3 wherein the step of separating organic components from said solvent is accomplished by (1) heating said solvent with organic components to a temperature that will fractionally distill off said solvent and (2) subsequently cooling the distilled-off solvent to a temperature that will condense said solvent.

5. The method of claim 4 further including mixing said solvent and said cleaning solution while in intimate contact to increase the intimate contact between them.

6. The method of claim 5 wherein the step of condensing said distilled-off solvent is accomplished at a location such that the condensed solvent falls by gravity into contact with said solvent.

7. The method of claim 1 wherein said cleaning solution is polar and said organic components are nonpolar.

8. The method of claim 7 wherein said cleaning solution is aqueous.

* * * * *